(12) United States Patent
Kleemann et al.

(10) Patent No.: US 10,315,695 B2
(45) Date of Patent: Jun. 11, 2019

(54) PIVOT BEARING

(71) Applicant: KSM Castings Group GmbH, Hildesheim (DE)

(72) Inventors: Markus Kleemann, Hildesheim (DE); Heik Lachmund, Holle (DE); Heiko Kauert, Bernau (DE)

(73) Assignee: KSM Castings Group GmbH, Hildesheim (DE)

( * ) Notice: Subject to any disclaimer, the term of this patent is extended or adjusted under 35 U.S.C. 154(b) by 148 days.

(21) Appl. No.: 15/711,133

(22) Filed: Sep. 21, 2017

(65) Prior Publication Data

US 2018/0086377 A1 Mar. 29, 2018

(30) Foreign Application Priority Data

Sep. 23, 2016 (DE) .......................... 10 2016 117 953

(51) Int. Cl.
*B62D 7/18* (2006.01)
*B60G 3/20* (2006.01)

(52) U.S. Cl.
CPC .............. *B62D 7/18* (2013.01); *B60G 3/202* (2013.01); *B60G 2206/50* (2013.01)

(58) Field of Classification Search
CPC ...... B62D 7/18; B60G 2206/50; B60G 3/202; B60G 3/205
See application file for complete search history.

(56) References Cited

U.S. PATENT DOCUMENTS

| | | | | |
|---|---|---|---|---|
| 5,829,768 A | * | 11/1998 | Kaneko | B21K 1/74 280/93.502 |
| 7,234,712 B2 | * | 6/2007 | Yamazaki | B60G 3/20 280/93.51 |
| 8,061,726 B2 | * | 11/2011 | Kunert | B60G 3/20 280/124.106 |
| 2002/0050694 A1 | * | 5/2002 | Mikasa | B60G 3/06 280/86.758 |
| 2003/0107201 A1 | * | 6/2003 | Chun | B60G 3/20 280/124.135 |
| 2004/0094924 A1 | * | 5/2004 | Jones | B60G 3/20 280/86.75 |

(Continued)

FOREIGN PATENT DOCUMENTS

DE 10 2004 020 073 A1 11/2005
DE 102010023231 A1 * 6/2011 ............... B62D 7/18
(Continued)

*Primary Examiner* — Ruth Ilan
(74) *Attorney, Agent, or Firm* — Collard & Roe, P.C.

(57) ABSTRACT

A pivot bearing, especially for a double wishbone axle for steerable wheels, especially front wheels, of a motor vehicle, in one embodiment is made as a one-piece cast part with a seat or recess for accommodation of a wheel bearing and seats or recesses for fastening of the same on the pivot bearing, two seats or recesses for linking of a brake caliper which are disposed substantially vertically with distance from one another, a seat or recess for linking of a track rod, a seat or recess for linking of a lower wishbone, a seat or recess for linking of a connecting rod, which substantially absorbs the longitudinal forces of the wheel, and a seat or recess for linking of an upper wishbone which is connected with the seat or recess for accommodation of the wheel bearing via a neck-like portion starting from same.

20 Claims, 4 Drawing Sheets

(56) References Cited

U.S. PATENT DOCUMENTS

| | | | | |
|---|---|---|---|---|
| 2012/0049477 A1* | 3/2012 | Webster | ............. | B22D 18/04 |
| | | | | 280/93.512 |
| 2013/0181421 A1* | 7/2013 | Rohde | ............. | B60G 13/006 |
| | | | | 280/93.512 |
| 2014/0197285 A1* | 7/2014 | Lucas | ............. | B60T 17/046 |
| | | | | 248/75 |
| 2014/0252741 A1* | 9/2014 | Corby | ............. | B60G 3/06 |
| | | | | 280/124.134 |
| 2014/0306412 A1* | 10/2014 | van der Jagt | ............. | B62D 7/18 |
| | | | | 280/93.508 |
| 2015/0360722 A1* | 12/2015 | Butlin, Jr. | ............. | B62D 17/00 |
| | | | | 280/86.758 |
| 2016/0264175 A1* | 9/2016 | Maruyama | ............. | B62D 7/18 |
| 2017/0036693 A1* | 2/2017 | Reid | ............. | B62D 7/18 |
| 2017/0305221 A1* | 10/2017 | Schmidt | ............. | B60G 3/20 |
| 2018/0037258 A1* | 2/2018 | Buschjohann | ............. | B62D 7/18 |
| 2019/0003022 A1* | 1/2019 | Cakrawala | ............. | B22C 9/22 |

FOREIGN PATENT DOCUMENTS

| | | | | |
|---|---|---|---|---|
| DE | 102012107491 A1 * | 5/2014 | ............. | B22C 9/103 |
| DE | 102013006243 A1 * | 10/2014 | ............. | B62D 7/18 |
| DE | 102015220774 A1 * | 4/2017 | ............. | B62D 7/18 |
| DE | 10212873 C5 * | 1/2019 | ............. | B60G 13/006 |
| EP | 1314630 A2 * | 5/2003 | ............. | B60G 13/006 |
| EP | 1864887 A2 * | 12/2007 | ............. | B62D 7/18 |
| JP | 2014091468 A * | 5/2014 | ............. | B62D 7/18 |
| WO | WO-2012139701 A1 * | 10/2012 | ............. | B60G 13/006 |

* cited by examiner

PIVOT BEARING

CROSS. REFERENCE TO RELATED APPLICATIONS

Applicant claims priority under 35 U.S.C. § 119 of German Application No. 10 2016 117 953.1 filed Sep. 23, 2016, the disclosure of which is incorporated by reference.

BACKGROUND OF THE INVENTION

1. Field of Invention

The invention relates to a pivot bearing, especially for a double-wishbone axle for steerable wheels, especially front wheels, of a motor vehicle.

2. Description of the Related Art

A pivot bearing according to the stated type is known from DE 10 2004 020 073 A1. The pivot bearing designated therein as wheel bearing is part of a double-wishbone front axle of a vehicle that leaves two tire tracks, which is provided with a lower detached connecting-rod level that guides the pivot bearing and that is formed by a wishbone, a track rod and a connecting rod that substantially absorbs the longitudinal forces of the wheel, and with an upper wishbone or wishbone assembly. The connecting rod that substantially absorbs the longitudinal forces of the wheel is a so-called tension strut or compression strut. The pivot bearing has corresponding linking points for the upper wishbone or wishbone assembly, for the lower wishbone, the track rod and the tension or compression strut. Because the wishbone as part of the wheel suspension has to accommodate a wheel bearing, the pivot bearing has a corresponding seat as well as linking points distributed around this seat for fastening of the wheel bearing. Moreover, the pivot bearing also has linking points for fastening of a brake caliper. The pivot bearing illustrated in the single figure of DE 10 2004 020 073 A1 is actually the pivot bearing of the left front wheel. The double-wishbone front axle disclosed in DE 10 2004 020 073 A1 is advantageously one in which the wheel guidance and wheel damping are separated from one another.

SUMMARY OF THE INVENTION

Starting from this prior art, the task underlying the invention is to optimize a pivot bearing according to the stated type, especially for a double-wishbone axle for steerable wheels, especially front wheels, of a motor vehicle, with respect to at least individual ones of the functions or requirements mentioned below. The pivot bearing according to the invention is intended to absorb and transmit all wheel forces and moments in operationally safe manner and to bridge over the installation space between kinematic points and wheel bearing system. Moreover, the pivot bearing according to the invention is intended to contribute to further reduction of unsprung masses and to have a high stiffness. Furthermore, the pivot bearing according to the invention is intended to have a ductility and geometry that permits a sufficient deformation of the pivot bearing before a failure. The pivot bearing according to the invention should be insensitive to corrosion, have a good processability and especially a reduced weight with simultaneously high loadability and be manufacturable inexpensively. In particular, the task underlying the invention is to provide a pivot bearing having a geometry that on the whole increases the system stiffness and thus further improves the wheel guidance.

This task is accomplished according to the invention by a pivot bearing, especially for a double wishbone axle for steerable wheels, especially front wheels, of a motor vehicle, comprising
  a seat or recess for the accommodation of a wheel bearing and seats or recesses for the fastening of the same on the pivot bearing,
  two seats or recesses, which are disposed substantially vertically with distance from one another for the linking of a brake caliper, and which, as viewed in travel direction, are disposed in front of the seat or recess for the accommodation of the wheel bearing,
  a seat or recess for the linking of a track rod which, as viewed in travel direction, is disposed behind the seat or recess for the linking of the wheel bearing,
  a seat or recess for the linking of a lower wishbone, which is disposed under the seats or recesses for the linking of the brake caliper,
  a seat or recess for the linking of a connecting rod, which substantially absorbs the longitudinal forces of the wheel, especially in the form of a tension strut or compression strut or of a suspension arm, and which is disposed under the seat or recess for the accommodation of the wheel bearing and, as viewed in travel direction, is behind the seat or recess for the linking of the lower wishbone, and
  a seat or recess for the linking of an upper wishbone, which is disposed above the seat or recess for the accommodation of the wheel bearing and is connected with this seat or recess via a neck-like portion starting from the same,
wherein the pivot bearing is made as a part cast in one piece with these seats or recesses and joining these seats or recesses to one another.

It may be advantageous if the neck-like portion of the pivot bearing is bounded, on its rear side pointing toward the opposite pivot bearing of the same axle in the installed condition of the pivot bearing, especially on its rear longitudinal side as viewed in travel direction, by a reinforcing wall or reinforcing rib.

It may be advantageous if the neck-like portion of the pivot bearing is bounded, on its rear side pointing toward the opposite pivot bearing of the same axle in the installed condition of the pivot bearing, especially on its front longitudinal side as viewed in travel direction, by a reinforcing wall or reinforcing rib.

It may be advantageous if the neck-like portion of the pivot bearing is bounded, on its rear side pointing toward the opposite pivot bearing of the same axle in the installed condition of the pivot bearing, by three reinforcing walls.

It may be advantageous if the neck-like portion has a thickened region which, starting from the seat or recess for the linking of the upper wishbone, runs predominantly vertically in the direction of the seat or recess for the accommodation of the wheel bearing, wherein the thickened region, as viewed in travel direction, is disposed in front of the non-thickened region of the neck-like portion.

It may be advantageous if the non-thickened region of the neck-like portion has an opening.

It may be advantageous if the pivot bearing has a seat or recess for the linking of a stabilizer which, as viewed in travel direction, is disposed behind the thickened region of the neck-like portion, inside the neck-like portion. It may be advantageous to dispose the seat or recess for the linking of the stabilizer in the installed condition of the pivot bearing above the opening within the non-thickened region of the neck-like portion, wherein it may be advantageous if the seat or recess for the linking of the stabilizer locally has a thickening at least partly surrounding the seat or recess.

It may be expedient if, adjacent to the seat or recess for the linking of the stabilizer, a seat or recess, preferably made from outside on one side, is provided, preferably in the rear reinforcing wall of the neck-like portion as viewed in travel direction, for the fastening of a tube and/or preferably of a cable holder.

It may be expedient if a seat or recess, especially a further one, preferably made from outside on one side, is disposed, in the rear reinforcing wall of the neck-like portion as viewed in travel direction, for the fastening of a tube and/or preferably of a cable holder.

It may be expedient if a seat or recess, especially a further one, preferably made from outside on one side, is disposed, in the front reinforcing wall of the neck-like portion as viewed in travel direction, for the fastening of a tube and/or preferably of a cable holder.

It may be advantageous if this same seat or recess, looking at a longitudinal side of the pivot bearing, i.e. as viewed either in travel direction or opposite the travel direction, is approximately S-shaped.

It may be advantageous if the seat or recess for the accommodation of the wheel bearing, together with the seats or recesses for the fastening of the same on the pivot bearing, is bounded by three reinforcing walls on its rear side pointing toward the opposite pivot bearing of the same axle in the installed condition of the pivot bearing.

It may be advantageous if one of the reinforcing walls bounding the neck-like portion of the pivot bearing runs downward, starting from the seat or recess for the linking of the upper wishbone on the front side of the neck-like portion as viewed in travel direction, and merges, preferably via a node point which, as viewed in travel direction, is disposed behind the upper of the seats or recesses for the linking of the brake caliper, into a transversely oriented reinforcing wall of the reinforcing walls bounding the neck-like portion of the pivot bearing, wherein the transversely oriented reinforcing wall preferably forms one of the reinforcing walls bounding the seat or recess for the accommodation of the wheel bearing and the seats or recesses for the fastening of the same on the pivot bearing.

It may be advantageous if the pivot bearing has a seat or recess for the accommodation of at least one sensor, especially an Anti-lock Braking System (ABS) sensor, and an adjacent seat or recess for the fastening of at least one sensor, especially an ABS sensor. It may be expedient if the seats or recesses for the accommodation and fastening of the sensor are disposed in the transversely oriented reinforcing wall, preferably in the region of the opening.

It may be advantageous if one of the reinforcing walls bounding the neck-like portion of the pivot bearing runs downward, starting from the seat or recess for the linking of the upper wishbone on the rear side of the neck-like portion as viewed in travel direction, and merges, preferably via a node point which, as viewed in travel direction, is disposed in front of the seat or recess for the linking of a track rod, into a transversely oriented reinforcing wall of the reinforcing walls bounding the neck-like portion of the pivot bearing, wherein the transversely oriented reinforcing wall preferably forms one of the reinforcing walls bounding the seat or recess for the accommodation of the wheel bearing and the seats or recesses for the fastening of the same on the pivot bearing.

It may be advantageous if one of the reinforcing walls bounding the seat or recess for the accommodation of the wheel bearing and the seats or recesses for the fastening of the same on the pivot bearing runs upward, starting from the seat or recess for the linking of the lower wishbone, and merges, preferably via a node point which, as viewed in travel direction, is disposed behind the upper of the seats or recesses for the linking of the brake caliper, into a transversely oriented reinforcing wall of the reinforcing walls bounding the seat or recess for the accommodation of the wheel bearing and the seats or recesses for the fastening of the same on the pivot bearing. The transversely oriented reinforcing wall preferably forms one of the reinforcing walls bounding the neck-like portion of the pivot bearing.

It may be advantageous if one of the reinforcing walls bounding the seat or recess for the accommodation of a wheel bearing and the seats or recesses for the fastening of the same on the pivot bearing runs upward, starting from the seat or recess for the linking of the connecting rod that substantially absorbs the longitudinal forces of the wheel, and merges, preferably via a node point which, as viewed in travel direction, is disposed in front of the seat or recess for the linking of the track rod, into a transversely oriented reinforcing wall of the reinforcing walls bounding the seat or recess for the accommodation of the wheel bearing and the seats or recesses for the fastening of the same on the pivot bearing. The transversely oriented reinforcing wall preferably forms one of the reinforcing walls bounding the neck-like portion of the pivot bearing.

For some application situations, it may be advantageous if no transversely oriented reinforcing wall is provided and the reinforcing walls provided on the respective longitudinal side of the pivot bearing merge into one another.

It may be advantageous if the two seats or recesses for the linking of the brake caliper, disposed vertically with distance from one another, are disposed, as viewed in travel direction, in front of the front reinforcing wall, as viewed in travel direction, bounding the seat or recess for the accommodation of the wheel bearing and the seats or recesses for the fastening of the same on the pivot bearing.

It may be advantageous if a reinforcing wall is provided that jointly forms the front longitudinal side of the pivot bearing as viewed in travel direction and that connects the lower of the seats or recesses for the linking of the brake caliper with the seat or recess for the linking of the lower wishbone.

It may be advantageous if the reinforcing wall connecting the lower of the seats or recesses for the linking of the brake caliper with the seat or recess for the linking of the lower wishbone is disposed, as viewed in travel direction, in front of the reinforcing wall that starts from the seat or recess for the linking of the lower wishbone and passes upward along the lower of the seats or recesses for the linking of the brake caliper.

It may be advantageous to join the seat or recess for the linking of the track rod in the manner of a web to the front node point as viewed in travel direction.

It may be advantageous if at least one reinforcing collar extends at least partly between the and/or on at least one of the two seats or recesses disposed vertically with distance from one another for the linking of the brake caliper.

It may be advantageous if a reinforcing collar extends at least partly, in the direction of the seat or recess for the linking of the upper wishbone, from the upper seat or recess of the two seats or recesses disposed vertically with distance from one another for the linking of the brake caliper.

It may be advantageous if a cutout open on one side toward the outside, i.e. pointing away from the opposite pivot bearing of the same axle, is provided on the front side of the pivot bearing as viewed in travel direction, preferably in a region spanned by the seat or recess for the accommodation of the wheel bearing, together with the seats or recesses for the fastening of the same on the pivot bearing, the seat or recess for the linking of the track rod as well as the seat or recess for the linking of the connecting rod that substantially absorbs the longitudinal forces of the wheel.

It may be advantageous if the seat or recess for the linking of the upper wishbone disposed in end position on the neck-like portion has sleeve-like form.

It may be advantageous if the seat or recess for the accommodation of the wheel bearing comprises a flange or clamping face fringing this seat or recess, wherein the flange face is perforated by several, preferably three screw through-holes for fastening of the wheel-bearing unit, wherein these are preferably distributively disposed in a manner spaced uniformly apart from one another on the circumference of the flange or clamping face.

It may be advantageous if the seat or recess for the linking of the upper wishbone has a sleeve-like shape provided with an elongated slit, wherein the seat is provided on its outer side with a seat disposed on both sides of the longitudinal slit for a clamping screw for fastening of the upper wishbone in the seat.

It may be advantageous if a pivot bearing is made from a lightweight material, preferably a light metal, particularly preferably from aluminum, an aluminum alloy and/or magnesium alloy.

It may be advantageous if the pivot bearing is made by squeeze casting, gravity die-casting, pressure die-casting, especially by thixotropic, rheological or low-pressure sand casting, or preferably in counter-pressure casting (CPC) in chill molds.

It may be advantageous if the same is made not as a cast part but instead as a part forged in one piece with these seats or recesses and joining them to one another.

It may be advantageous if the same is formed not only as a cast part but as a part made from a combination of casting and forging, preferably casting and subsequent forging, and joining these seats or recesses to one another.

It may be advantageous if the seat or recess for the accommodation of the wheel bearing, the seats or recesses for the fastening of the wheel bearing on the pivot bearing and the two seats or recesses disposed substantially vertically with distance from one another for the linking of the brake caliper are aligned predominantly horizontally as viewed in travel direction.

It may be advantageous if the seat or recess for the linking of the track rod, the seat or recess for the linking of the lower wishbone, the seat or recess for the linking of the connecting rod that substantially absorbs the longitudinal forces of the wheel and the seat or recess for the linking of the upper wishbone are aligned predominantly vertically as viewed in travel direction.

BRIEF DESCRIPTION OF THE DRAWINGS

Other objects, features, advantageous configurations and details of the invention will become apparent from the following detailed description considered in connection with the accompanying drawings. It is to be understood, however, that the drawings are designed as an illustration only and not as a definition of the limits of the invention.

In the drawings, wherein like reference symbols also designate like parts or regions.

DETAILED DESCRIPTION OF PREFERRED EMBODIMENTS

Figure 1:
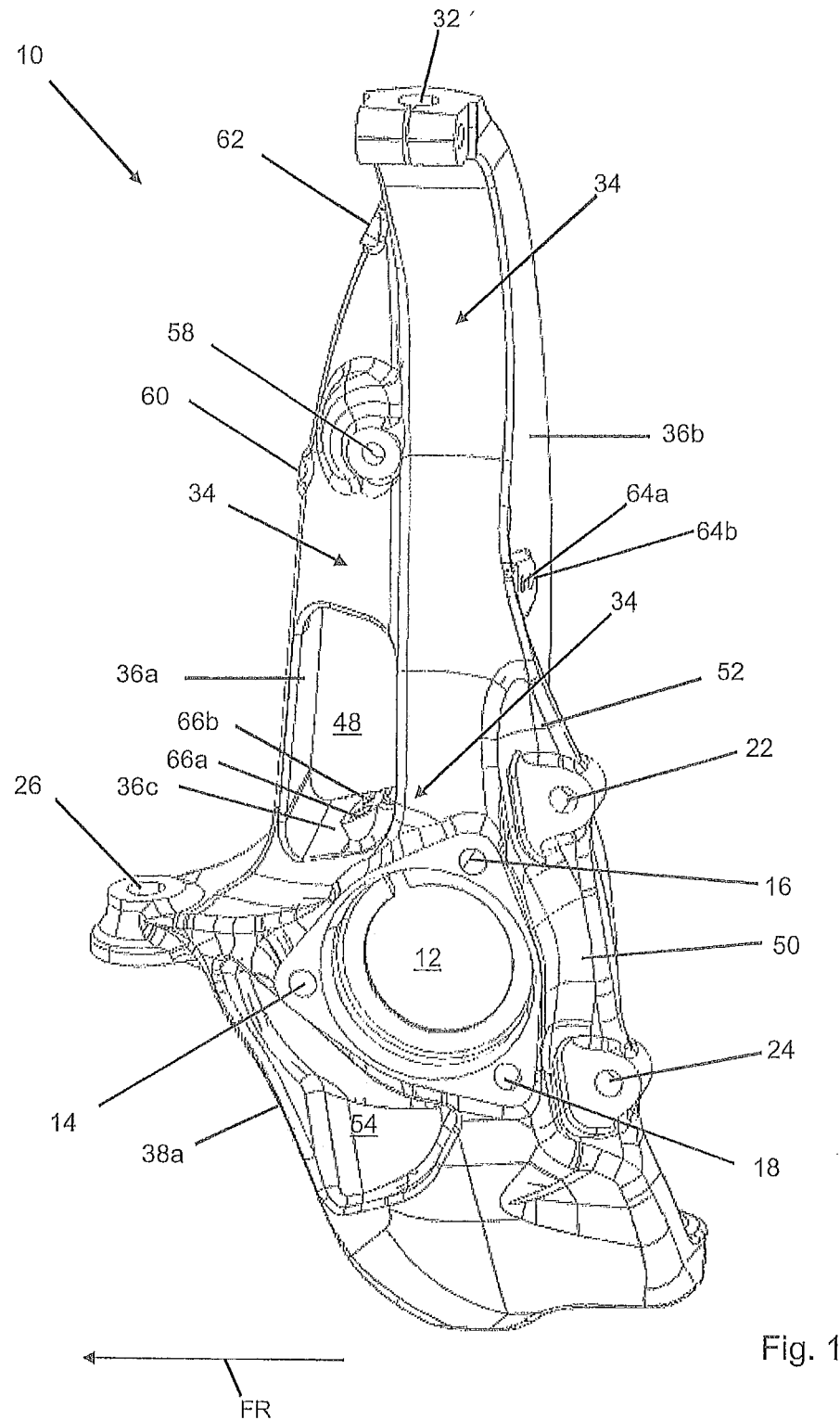
FIG. 1 shows a perspective view of the front side of the pivot bearing according to the invention for the left steerable wheel of a double-wishbone front axle.
Figure 2:
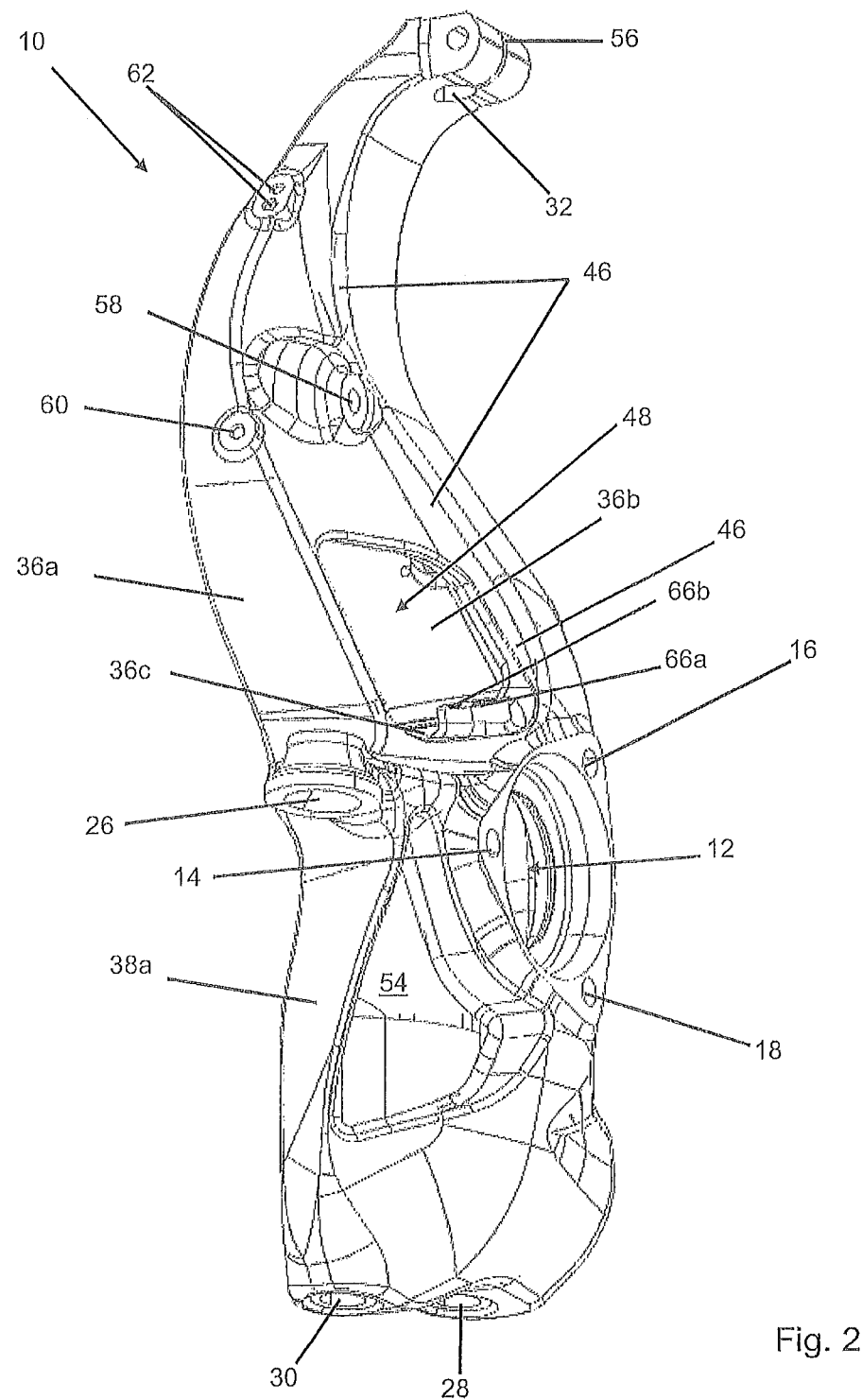
FIG. 2 shows a perspective view of the rear longitudinal side, as viewed in travel direction, of the pivot bearing according to the invention according to FIG. 1.
Figure 3:
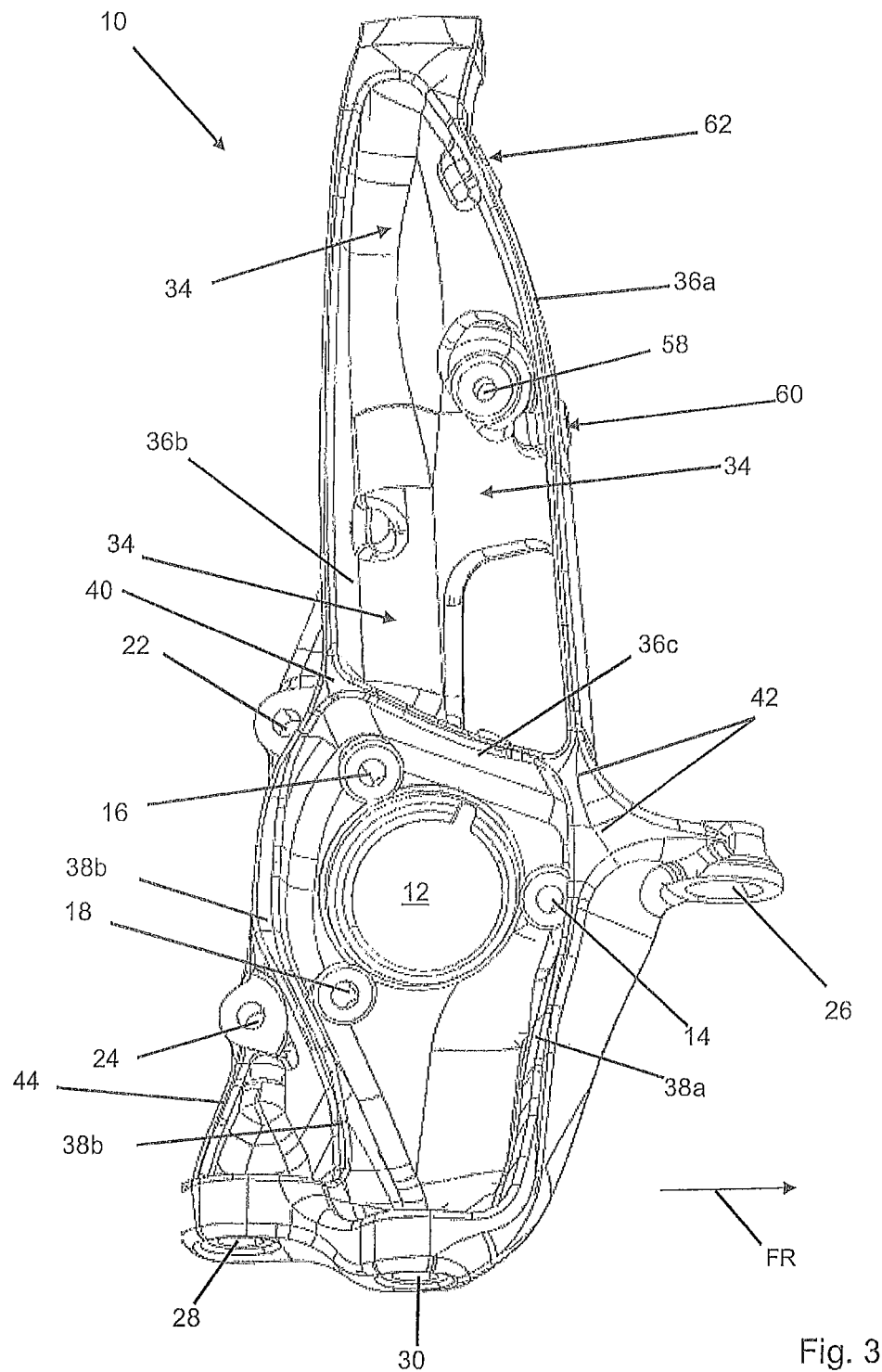
FIG. 3 shows a perspective view of the rear side of the pivot bearing according to the invention according to FIG. 1
Figure 4:
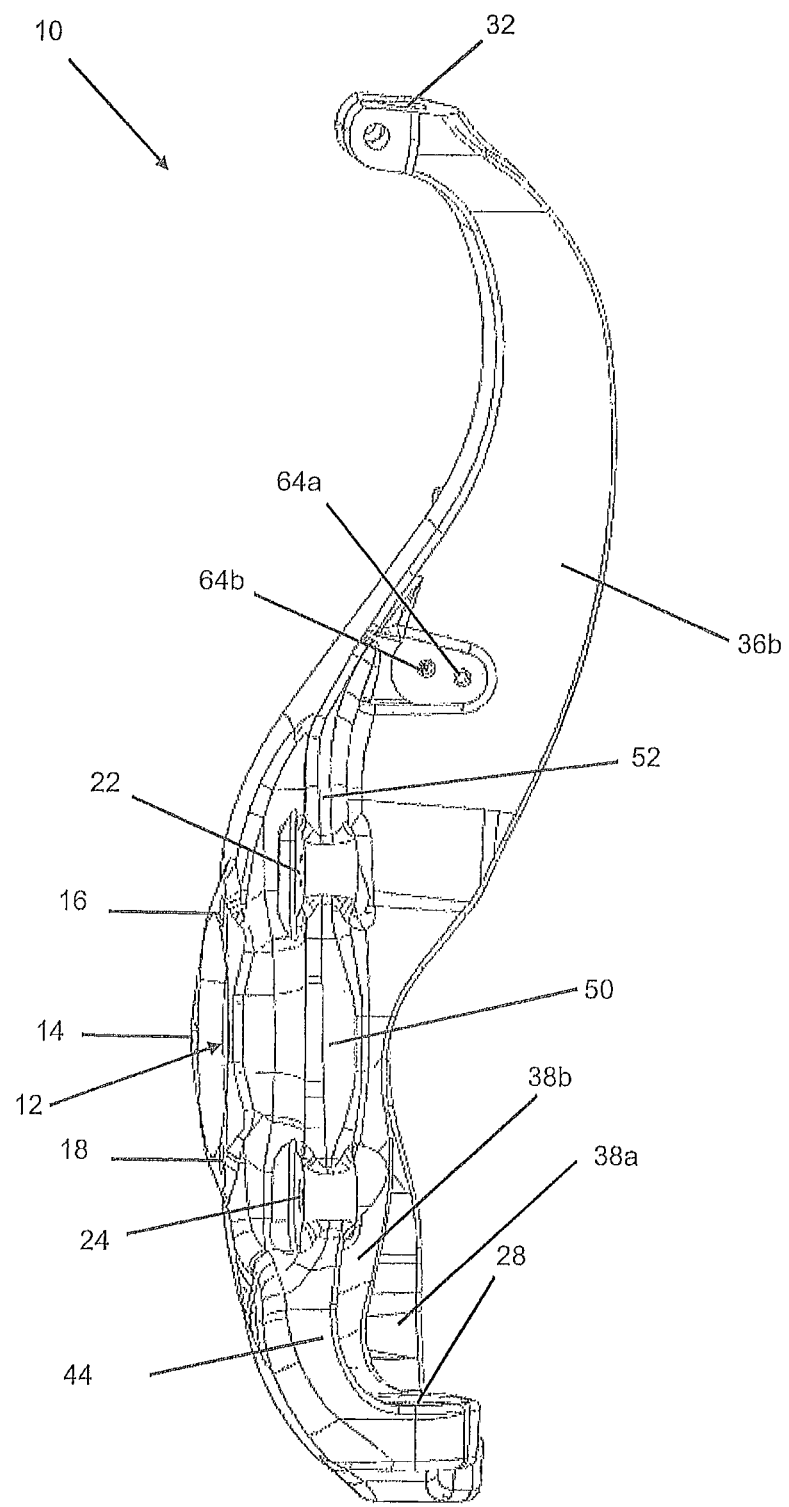
FIG. 4 shows a perspective view of the front longitudinal side, as viewed in travel direction, of the pivot bearing according to the invention according to FIG. 1.

The illustrated pivot bearing 10 according to the invention is manufactured from a light-metal material, preferably an aluminum alloy, and preferably in counter-pressure casting (CPC) in chill molds.

The pivot bearing 10, which advantageously is provided for a double-wishbone front axle for steerable wheels of a motor vehicle, comprises a seat or recess 12 for the accommodation of a wheel bearing and seats or recesses 14, 16, 18 for the fastening of the same on the pivot bearing 10, two seats or recesses 22, 24, disposed substantially vertically with distance from one another, for the linking of a brake caliper, which 22, 24, as viewed in travel direction FR, are disposed in front of the seat or recess 12 for the accommodation of the wheel bearing, a seat or recess 26 for the linking of a track rod, which seat or recess 26, as viewed in travel direction FR, is disposed behind the seat or recess 12 for the accommodation of the wheel bearing, a seat or recess 28 for the linking of a lower wishbone, which seat or recess 28 is disposed under the seats or recesses 22, 24 for the linking of the brake caliper, a seat or recess 30 for the linking of a connecting rod that substantially absorbs the longitudinal forces of the wheel, especially in the form of a tension strut or compression strut or of a suspension arm, which seat or recess 30 is disposed under the seat or recess 12 for the accommodation of the wheel bearing and, viewed in travel direction FR, is disposed behind the seat or recess 28 for the linking of the lower wishbone, and a seat or recess 32 for the linking of an upper wishbone, which seat or recess 32 is disposed above the seat or recess 12 for the accommodation of the wheel bearing and is connected with this seat or recess for the accommodation of the wheel bearing 12 via a neck-like portion 34 starting from the same seat or recess 12, wherein the pivot bearing 10 is made as a part cast in one piece with these seats or recesses 12, 14, 16, 18, 22, 24, 26, 28, 30, 32 and joining these seats or recesses to one another.

In the installed condition of the pivot bearing 10, the neck-like portion 34 of the pivot bearing 10 is bounded, on its rear side pointing toward the opposite pivot bearing 12 of the same axle, by three reinforcing walls 36a, 36b, 36c.

The neck-like portion 34 has a thickened region 46 which, starting from the seat or recess 32 for the linking of the upper wishbone runs predominantly vertically in the direction of the seat or recess 12 for the accommodation of the wheel bearing, wherein the thickened region 46, as viewed in travel direction FR, is disposed in front of the non-thickened region of the neck-like portion 34.

The non-thickened region of the neck-like portion 34 has an opening 48.

Moreover, the pivot bearing 10 has a seat or recess 58 for the linking of a stabilizer, which seat or recess 58, as viewed in travel direction FR, is disposed behind the thickened region 46 of the neck-like portion 34 inside the neck-like portion 34. In the installed condition of the pivot bearing 10, the seat or recess 58 for the linking of the stabilizer is disposed above the opening 48 inside the non-thickened region of the neck-like portion 34, wherein it may be expedient, if the seat or recess 58 for the linking of the stabilizer locally has a thickening that at least partly surrounds the seat or recess 58.

The pivot bearing 10, looking at a longitudinal side of the pivot bearing 10, i.e. as viewed either in travel direction FR or opposite the travel direction FR, is S-shaped.

The seat or recess 12 for the accommodation of the wheel bearing, together with the seats or recesses 14, 16, 18 for the fastening of the same on the pivot bearing 10, is bounded, on its rear side pointing toward the opposite pivot bearing 12 of the same axle in the installed condition of the pivot bearing 10, by three reinforcing walls 36c, 38a, 38b.

One reinforcing wall 36b of the reinforcing walls 36a, 36b, 36c bounding the neck-like portion 34 of the pivot bearing 10 runs downward, starting from the seat or recess 32 for the accommodation of the upper wishbone to the rear side of the neck-like portion 34 as viewed in travel direction, and merges, via a node point 40 which, viewed in travel direction FR, is disposed behind the upper seat or recess 22 of the seats or recesses 22, 24 for the linking of the brake caliper, into a transversely oriented reinforcing wall 36c of the reinforcing walls 36a, 36b, 36c bounding the neck-like portion 34 of the pivot bearing 10, wherein the transversely oriented reinforcing wall 36c forms one reinforcing wall 36c of the reinforcing walls 36c, 38a, 38b bounding the seat or recess 12 for the accommodation of the wheel bearing and the seats or recesses 14, 16, 18 for the fastening of the same on the pivot bearing 10.

One reinforcing wall 36a of the reinforcing walls 36a, 36b, 36c bounding the neck-like portion 34 of the pivot bearing 10 likewise runs downward, starting from the seat or recess 32 for the linking of the upper wishbone on the rear side of the neck-like portion 34 as viewed in travel direction, and merges, via a further node point 42 which, as viewed in travel direction, is disposed in front of the seat or recess 26 for the linking of a track rod, into the transversely oriented reinforcing wall 36c of the reinforcing walls 36a, 36b, 36c bounding the neck-like portion 34 of the pivot bearing 10.

Adjacent to the seat or recess 58 for the linking of the stabilizer, preferably in the rear reinforcing wall 36a of the neck-like portion 34 as viewed in travel direction FR, a seat or recess 60, preferably made from outside on one side, is provided for the fastening of a tube and/or preferably of a cable holder. In the installed condition of the pivot bearing 10, this seat or recess 60 is disposed under the seat or recess 58 for the linking of the stabilizer.

In the rear reinforcing wall 36a of the neck-like portion 34 as viewed in travel direction FR, a further seat or recess 62, preferably made from outside on one side, is disposed for the fastening of a tube and/or preferably of a cable holder. In the installed condition of the pivot bearing 10, this seat or recess 62 is disposed with spacing above the seat or recess 58 for the linking of the stabilizer.

In the front reinforcing wall 36b of the neck-like portion 34 as viewed in travel direction FR, two seats or recesses 64a, 64b, made from outside on one side, are disposed for the fastening of a tube and of a cable holder.

One reinforcing wall 38b of the reinforcing walls 36c, 38a, 38b bounding the seat or recess 12 for the accommodation of the wheel bearing and the seats or recesses 14, 16, 18 for the fastening of the same on the pivot bearing 10 runs upward, starting from the seat or recess 28 for the binding of the lower wishbone and, via the node point 40, likewise merges into the transversely oriented reinforcing wall 36c.

One further reinforcing wall 38a of the reinforcing walls 36c, 38a, 38b bounding the seat or recess 12 for the accommodation of the wheel bearing and the seats or recesses 14, 16, 18 for the fastening of the same on the pivot bearing 10 likewise runs upward, starting from the seat or recess 30 for the binding of the connecting rod that substantially absorbs the longitudinal forces of the wheel and, via the node point 42, likewise merges into the transversely oriented reinforcing wall 36c.

The pivot bearing 10 additionally has a seat or recess 66a for the accommodation of at least one sensor, especially an ABS sensor, and a seat or recess 66b disposed close to this seat or recess 66a for fastening of the sensor, especially the ABS sensor. The seats or recesses 66a, 66b for the accommodation and fastening of the sensor are disposed in the transversely oriented reinforcing wall 36c, preferably in the region of the opening 48.

For some application situations, it may be advantageous if no transversely oriented reinforcing wall 36c is provided and the reinforcing walls 36a and 38a as well as 36b and 38b provided on the respective longitudinal side of the pivot bearing merge into one another.

The two seats or recesses 22, 24 for the linking of the brake caliper, disposed vertically with distance from one another, are disposed, as viewed in travel direction FR, in front of the front reinforcing wall 38b, as viewed in travel direction FR, bounding the seat or recess 12 for the accommodation of the wheel bearing and the seats or recesses 14, 16, 18 for the fastening of the same on the pivot bearing 10.

Furthermore, a reinforcing wall 44 is provided that jointly forms the front longitudinal side of the pivot bearing 10 as viewed in travel direction FR and that connects the lower seat or recess 24 of the seats or recesses 22, 24 for the linking of the brake caliper with the seat or recess 28 for the linking of the lower wishbone.

This reinforcing wall 44, as viewed in travel direction, is disposed in front of the reinforcing wall 38b which, starting from the seat or recess 28 for the linking of the lower wishbone, passes upward along the lower seat or recess 24 of the seats or recesses 22, 24 for the linking of the brake caliper.

The seat or recess 26 for the linking of the track rod is joined in the manner of a web to the front node point 42 as viewed in travel direction FR.

A reinforcing collar 50 extends between the two seats or recesses 22, 24 disposed vertically with distance from one another for the linking of the brake caliper. A further reinforcing collar 52 extends at least partly, in the direction of the seat or recess 32 for the linking of the upper wishbone, from the upper seat or recess 22 of the two seats or recesses 22, 24 disposed vertically with distance from one another for the linking of the brake caliper.

On the rear side of the pivot bearing 10 as viewed in travel direction FR, a cutout 54 open on one side toward the outside, i.e. pointing away from the opposite pivot bearing of the same axle, is provided, namely in a region spanned by the seat or recess 12 for the accommodation of the wheel bearing together with the seats or recesses 14, 18 for the fastening of the same on the pivot bearing 10, the seat or recess 26 for the linking of the track rod as well as the seat or recess 30 for the linking of the connecting rod that substantially absorbs the longitudinal forces of the wheel.

The seat or recess 32 for the linking of the upper wishbone, disposed in end position on the neck-like portion 34, has sleeve-like form.

The seat or recess 12 for the accommodation of the wheel bearing comprises a flange or clamping face fringing this seat or recess 12, wherein the flange face is perforated by three screw through-holes 14, 16, 18 for fastening of the wheel-bearing unit, wherein these 14, 16, 18 are distributively disposed in a manner spaced uniformly apart from one another on the circumference of the flange or clamping face.

The seat or recess 32 for the linking of the upper wishbone has a sleeve-like shape provided with an elongated slit 56, wherein the seat 32 is provided on its outer side with a seat disposed on both sides of the longitudinal slit for a clamping screw for fastening of upper wishbone in the seat 32.

The seat or recess 12 for the accommodation of the wheel bearing, the seats or recesses 14, 16, 18 for the fastening of the wheel bearing to the pivot bearing 10 and the two seats or recesses 22, 24 disposed substantially vertically with distance from one another for the linking of the brake caliper are aligned predominantly horizontally as viewed in travel direction.

The seat or recess 26 for the linking of the track rod, the seat or recess 28 for the linking of the lower wishbone, the seat or recess 30 for the linking of the connecting rod that substantially absorbs the longitudinal forces of the wheel and the seat or recess 32 for the linking of the upper wishbone are aligned predominantly vertically as viewed in travel direction FR.

Although only a few embodiments of the present invention have been shown and described, it is to be understood that many changes and modifications may be made thereunto without departing from the spirit and scope of the invention.

What is claimed is:

1. A pivot bearing for a wheel of a motor vehicle comprising:
   (a) a wheel bearing accommodation seat or recess for accommodation of a wheel bearing;
   (b) a neck-shaped portion extending from the wheel bearing accommodation seat or recess;
   (c) a plurality of fastening seats or recesses for fastening of the wheel bearing;
   (d) first and second brake caliper linking seats or recesses for linking of a brake caliper, wherein the first and second brake caliper linking seats or recesses are disposed substantially vertically and spaced from one another and as viewed in a travel direction are disposed in front of the wheel bearing accommodation seat or recess;
   (e) a track rod linking seat or recess for linking of a track rod, wherein the track rod linking seat or recess, as viewed in the travel direction, is disposed behind the wheel bearing accommodation seat or recess;
   (f) a lower wishbone linking seat or recess for linking of a lower wishbone, wherein the lower wishbone linking seat or recess is disposed under the first and second brake caliper linking seats or recesses;
   (g) a connecting rod linking seat or recess for linking of a connecting rod substantially absorbing longitudinal forces of the wheel, wherein the connecting rod linking seat or recess is disposed under the wheel bearing accommodation seat or recess and, as viewed in the travel direction, is behind the lower wishbone linking seat or recess; and
   (h) an upper wishbone linking seat or recess for linking of an upper wishbone, wherein the upper wishbone linking seat or recess is disposed above and connected via the neck-shaped portion to the wheel bearing accommodation seat or recess;
   wherein the pivot bearing is made as a part cast in one piece having and joining to one another the wheel bearing accommodation seat or recess, the fastening seats or recesses, the first and second brake caliper linking seats or recesses, the track rod linking seat or recess, the lower wishbone linking seat or recess, the connecting rod linking seat or recess, and the upper wishbone linking seat or recess.

2. The pivot bearing according to claim 1, wherein the neck-shaped portion has a thickened region extending predominantly vertically from the upper wishbone linking seat or recess in a direction of the wheel bearing accommodation seat or recess, wherein the thickened region, as viewed in the travel direction, is disposed in front of a non-thickened region of the neck-shaped portion.

3. The pivot bearing according to claim 2, wherein the non-thickened region of the neck-shaped portion has an opening.

4. The pivot bearing according to claim 2, further comprising a stabilizer linking seat or recess for linking of a stabilizer wherein the stabilizer linking seat or recess, as viewed in the travel direction, is disposed inside the neck-shaped portion behind the thickened region of the neck-shaped portion.

5. The pivot bearing according to claim 1, wherein a longitudinal side of the pivot bearing is S-shaped as viewed either in the travel direction or in a direction opposite the travel direction.

6. The pivot bearing according to claim 1, further comprising a reinforcing wall forming a front longitudinal side of the pivot bearing as viewed in the travel direction and connecting the second brake caliper linking seat or recess with the lower wishbone linking seat or recess, wherein the second brake caliper linking seat or recess is below the first brake caliper linking seat or recess.

7. The pivot bearing according to claim 6, further comprising a wheel bearing accommodation seat or recess bounding reinforcing wall extending from the lower wishbone linking seat or recess and upwardly past the second brake caliper linking seat or recess, wherein the reinforcing wall is disposed, as viewed in the travel direction, in front of the wheel bearing accommodation seat or recess bounding reinforcing wall.

8. The pivot bearing according to claim 6, further comprising a reinforcing collar extending at least partly toward the upper wishbone linking seat or recess from the first brake caliper linking seat or recess.

9. The pivot bearing according to claim 1, wherein the track rod linking seat or recess is joined as a web to a front node point disposed in front of the track rod linking seat or recess as viewed in the travel direction.

10. The pivot bearing according to claim 1, further comprising at least one reinforcing collar extending at least partly between the first and second brake caliper linking seats or recesses or on at least one of the first and second brake caliper linking seats or recesses.

11. An assembly comprising an axle for a wheel of a motor vehicle, a first pivot bearing for the axle, and a second pivot bearing for the axle and opposite the first pivot bearing in an installed condition, wherein the first pivot bearing comprises:

(a) a wheel bearing accommodation seat or recess for accommodation of a wheel bearing;

(b) a neck-shaped portion extending from the wheel bearing accommodation seat or recess;

(c) a plurality of fastening seats or recesses for fastening of the wheel bearing;

(d) first and second brake caliper linking seats or recesses for linking of a brake caliper, wherein the first and second brake caliper linking seats or recesses are disposed substantially vertically and spaced from one another and as viewed in a travel direction are disposed in front of the wheel bearing accommodation seat or recess;

(e) a track rod linking seat or recess for linking of a track rod, wherein the track rod linking seat or recess, as viewed in the travel direction, is disposed behind the wheel bearing accommodation seat or recess;

(f) a lower wishbone linking seat or recess for linking of a lower wishbone, wherein the lower wishbone linking seat or recess is disposed under the first and second brake caliper linking seats or recesses;

(g) a connecting rod linking seat or recess for linking of a connecting rod substantially absorbing longitudinal forces of the wheel, wherein the connecting rod linking seat or recess is disposed under the wheel bearing accommodation seat or recess and, as viewed in the travel direction, is behind the lower wishbone linking seat or recess; and (h) an upper wishbone linking seat or recess for linking of an upper wishbone, wherein the upper wishbone linking seat or recess is disposed above and connected via the neck-shaped portion to the wheel bearing accommodation seat or recess;

wherein the first pivot bearing is made as a part cast in one piece having and joining to one another the wheel bearing accommodation seat or recess, the fastening seats or recesses, the first and second brake caliper linking seats or recesses, the track rod linking seat or recess, the lower wishbone linking seat or recess, the connecting rod linking seat or recess, and the upper wishbone linking seat or recess; and wherein the neck-shaped portion has a rear side pointing toward the second pivot bearing in the installed condition by a first neck-shaped portion bounding reinforcing wall.

12. The assembly according to claim wherein the neck-shaped portion of the first pivot bearing is bounded, on a front longitudinal side of the neck-shaped portion as viewed in the travel direction, by a second neck-shaped portion bounding reinforcing wall.

13. The assembly according to claim 11, wherein the neck-shaped portion of the first pivot bearing is bounded, on the rear side pointing toward the second pivot bearing in the installed condition, by the first neck-shaped portion bounding reinforcing wall and second and third neck-shaped portion bounding reinforcing walls.

14. The assembly according to claim 13, wherein the third neck-shaped portion bounding reinforcing wall is transversely oriented, wherein the second neck-shaped portion bounding reinforcing wall extends downwardly from the upper wishbone linking seat or recess on a front side of the neck-shaped portion as viewed in the travel direction and merges into the third neck-shaped portion bounding reinforcing wall.

15. The assembly according to claim 14, wherein the first neck-shaped portion bounding reinforcing wall extends downwardly from the upper wishbone linking seat or recess on the rear side of the neck-shaped portion as viewed in the travel direction and merges into the third neck-shaped portion bounding reinforcing wall.

16. The assembly according to claim 11, wherein the wheel bearing accommodation seat or recess, together with the fastening seats or recesses, is bounded, on a rear side of the first pivot bearing pointing toward the second pivot bearing in the installed condition, by first, second, and third wheel bearing accommodation seat or recess bounding reinforcing walls.

17. The assembly according to claim 16, wherein the third wheel bearing accommodation seat recess bounding reinforcing wall is transversely oriented, wherein the second wheel bearing accommodation seat or recess bounding reinforcing wall extends upwardly from the lower wishbone linking seat or recess and merges into the third wheel bearing accommodation seat or recess reinforcing wall.

18. The assembly according to claim 17, wherein the first wheel bearing accommodation seat or recess bounding reinforcing wall extends upwardly from the connecting rod linking seat or recess and merges into the third wheel bearing accommodation seat or recess reinforcing wall.

19. The assembly according to claim 16, wherein the first and second brake caliper linking seats or recesses are disposed, as viewed in the travel direction, in front of the second reinforcing wall.

20. The assembly according to claim 11, further comprising a cutout on a front side of the first pivot bearing as viewed in the travel direction and open exteriorly on a side of the cutout away from the second pivot bearing.

* * * * *